Jan. 20, 1953
J. L. RAWLINGS
2,625,742
RETICLE MOUNT AND ADJUSTING MECHANISM
Filed June 14, 1948
2 SHEETS—SHEET 1
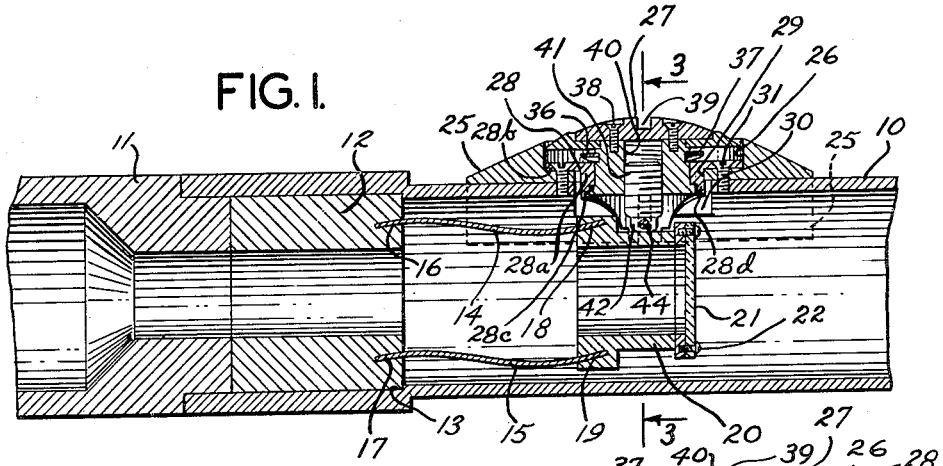
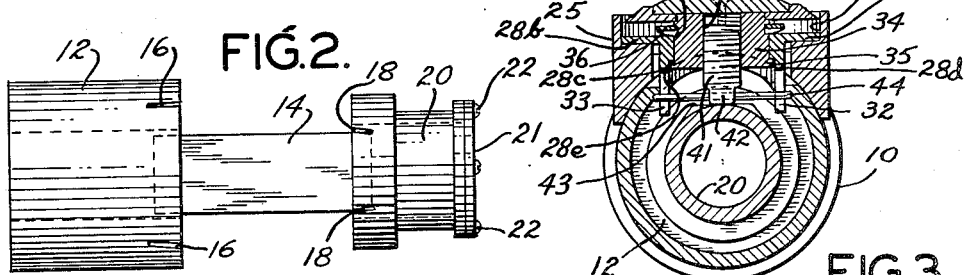
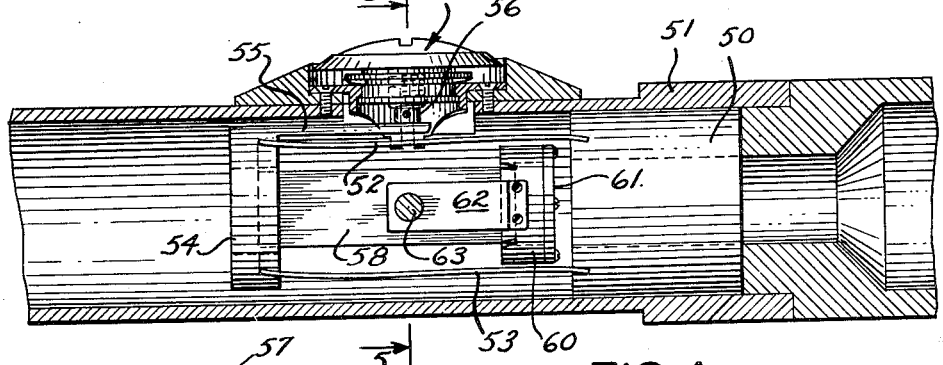
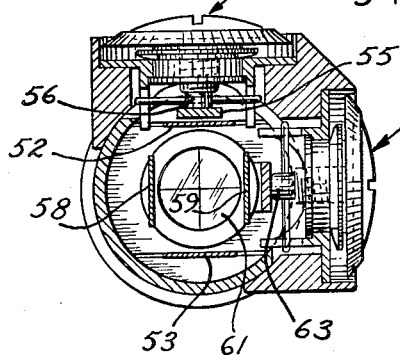
INVENTOR.
JOHN LIONEL RAWLINGS
BY
Campbell, Brumbaugh, Free & Graves
his ATTORNEYS.

INVENTOR.
JOHN LIONEL RAWLINGS

Patented Jan. 20, 1953

2,625,742

UNITED STATES PATENT OFFICE 2,625,742

RETICLE MOUNT AND ADJUSTING MECHANISM

John Lionel Rawlings, Elmont, N. Y., assignor to Kollmorgen Optical Corporation, Brooklyn, N. Y., a corporation of New York Application June 14, 1948, Serial No. 32,917

7 Claims. (Cl. 33—50)

This invention relates to improvements in optical instruments and it relates particularly to reticle mounts for use in optical instruments, such as for example, telescopic rifle sights, fire control instruments and the like.

The adjustable reticles commonly used in optical instruments must be precisely positioned and accurately adjustable to be of any substantial utility. Inasmuch as telescopic sights and the like are subjected to considerable shock during firing, the adjusting mechanism for the reticle must be sufficiently sturdy to prevent the reticle from being jarred out of its adjusted position. Moreover, the adjusting mechanism should be of such nature that movement of the adjusting knob or dial will cause a corresponding movement of the reticle to correct for range or elevation and/or windage.

Because of the precision nature of the reticle adjustment and the necessity for a sturdy supporting and adjusting mechanism, such mounts have been rather complicated heretofore and relatively expensive. Usually, the reticle mounts include guide rods or frames along which the reticles are adjusted to correct for range or windage or both. When only one reticle adjustment is provided the guides and adjusting screws can be reduced in number and complexity. Nevertheless, the guides must be machined within very close tolerances in order to prevent wobbling of the reticle and its supporting frame. Also, the adjusting mechanism, usually a threaded device, must be machined within extremely close tolerances so that backlash is reduced to a minimum.

An object of the present invention is to provide a simplified form of reticle mount which reduces the number of precision parts to a minimum without loss of accuracy in adjusting of the device.

A further object of the invention is to provide a reticle mount which may be easily assembled and introduced into the lens tube of the optical instrument and which, when assembled, is a precision instrument permitting very fine adjustment of the reticle.

A further object of the invention is to provide a simplified form of reticle mount which permits adjustment for elevation or range and windage by means of conveniently located adjusting knobs and which is not jarred out of adjustment by any reasonably expected shock or impact.

The above and further objects of the invention will become apparent from the following description of typical forms of reticle mounts embodying the present invention.

In accordance with the present invention, a reticle mount has been provided in which the reticle is supported by a holder which is suspended movably by means of a pair of elongated members which always maintain the reticle perpendicular to the optical axis of the instrument and normally urge it against a member for adjusting the reticle. More particularly, the reticle mount may include a tubular member which is fixedly mounted in the lens tube or barrel of an optical instrument and which supports another smaller tubular element by means of a pair of leaf spring members which permit movement of the smaller tubular member transversely of the lens tube or barrel. When adjustment for only elevation or windage is desired, the reticle may be mounted directly on the smaller tubular member and may be adjusted by means of a suitable knob and plunger mechanism which flexes the springs to displace the reticle transversely of the tube. In devices requiring adjustment for both elevation and windage, a second set of spring elements may be connected to the smaller tubular member and disposed generally in planes permitting them to flex at a right angle to the direction of flexing of the first-mentioned group of springs. The reticle may be carried by the second pair of springs and suitable adjusting knobs may be provided for flexing either or both sets of springs to adjust the reticle along right-angularly related lines. Due to the inherent transverse rigidity of the springs, it is unnecessary to provide guiding elements for any of the elements of the mount and adjustment of the reticle by flexing the springs does not cause drifting or lateral movement of the reticle.

For a better understanding of the present invention, reference may be had to the accompanying drawings, in which:

Fig. 1 is a view in longitudinal section through a portion of an optical instrument having a reticle mount and adjusting means of a type embodying the present invention installed therein;

Fig. 2 is a top plan view of the reticle mount shown in Fig. 1;

Fig. 3 is a view in cross-section taken on line 3—3 of Fig. 1;

Fig. 4 is a view in longitudinal section through a part of an optical instrument containing a reticle mount which is capable of adjustment for both windage and elevation;

Fig. 5 is a view in section taken on line 5—5 of Fig. 4;

Figure 6:
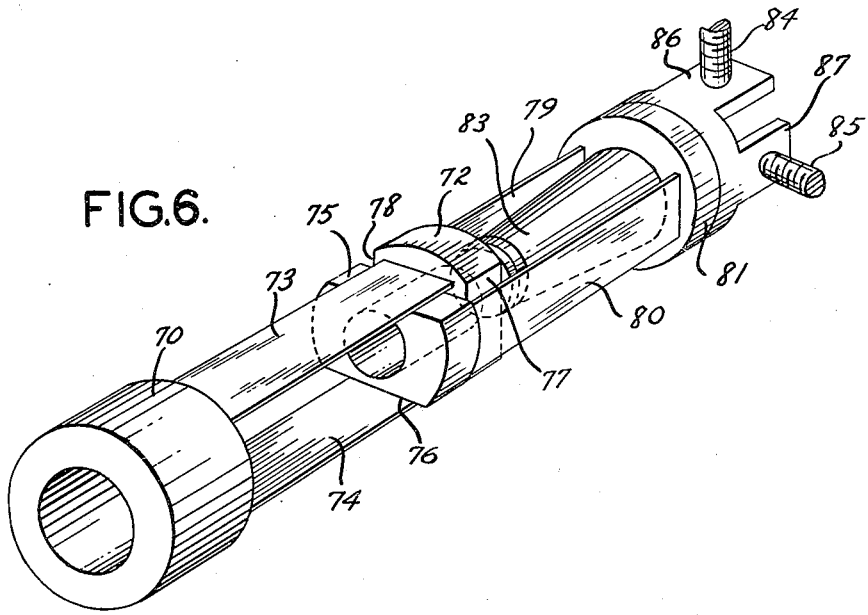
Fig. 6 is a perspective view of still another type of reticle mount shown removed from the optical instrument and having the adjusting screws thereon shown diagrammatically.

Reticle mounts of the type embodying the present invention may be used with many different types of optical instruments, and it is disclosed herein as used in a telescopic sight for a rifle.

Referring now to Fig. 1, the telescopic sight may include the usual lens tube or barrel 10 which has at one end a removable lens tube section 11 in which lenses of the telescope may be mounted. It will be understood that the telescopic sight may include the usual lenses and prisms, if it is of the prism type. The reticle mount illustrated in Figs. 1, 2 and 3 is adjustable for elevation only. Adjustment for windage may be accomplished by moving the entire telescope as is common in many types of telescope mounts.

The reticle mount includes a tubular supporting member 12 which may be formed of metal, plastic or the like which is detachably retained in the tube 10 by engagement between the shoulder 13 in the tube and the lens tube portion 11. Projecting from the right-hand end of the supporting member 12 are a pair of thin, wide springs 14 and 15 which are located on opposite sides of the axis of the lens tube 10 and the tubular support 12. Preferably, as shown in Fig. 1, the left-hand ends of the springs are set in slots 16 and 17 in the end of the support 12, these slots being inclined to the axis of the tube so that the springs 14 and 15 would normally tend to incline upwardly as viewed in Fig. 1. The opposite ends of the springs 14 and 15 are received in slots 18 and 19 in a tubular reticle holder 20. The slots 18 and 19 are parallel with the slots 16 and 17 so that when the springs are relieved of pressure, they would normally tend to force the reticle holder 20 upwardly against the upper side of the barrel or tube 10. When, however, the holder 20 is forced downwardly, the springs 14 and 15 are flexed as shown in Fig. 1. Springs 14 and 15 therefore act to force the reticle holder 20 out of axial alignment with the support 12 but at the same time to maintain these two elements parallel regardless of the adjusted position of the reticle holder 20. As indicated in Figs. 1 and 2, the reticle 21 may be mounted on the right-hand end of the member 20 by means of suitable screws 22 or in any other desired way. The reticle 21 is perpendicular to the axis of the tube 10 and remains so in all adjusted positions.

In order to adjust the position of the reticle holder 20, an adjusting mechanism is provided which is suitable for use, for example, on a telescopic rifle sight. As shown in Figs. 1 and 3, the adjusting mechanism may include a saddle member 25 formed of plastic or the like which is shaped to conform to the external curvature of the tube or barrel 10. The saddle is provided with a circular recess 26 therein for receiving the adjusting knob 27 and other mechanism. The saddle 25 is retained in position by means of a flanged tubular guide member 28 which has a cylindrical body portion 28a that extends through an opening 29 in the saddle and an opening 30 in the lens tube. This guide member 28 is provided with an annular flange 28b which overlies the bottom of the recess 26 and is secured to the lens tube by means of suitable screws 30 which extend through the flange 28b, the interposed portion of the saddle 25 and are threaded into the barrel 10. The guide member 28 is provided with an internal annular shoulder 28c and also with downwardly extending portions 28d and 28e on opposite sides thereof which are provided with slots 32 and 33 for a purpose to be described.

Mounted within the member 28 is a cylindrical member 34 having an outwardly projecting flange 35 which bears against the shoulder 28c and prevents upward movement of the member 34 when these elements are assembled. The flange 35 is retained in engagement with the shoulder by means of a split spring washer 36 which engages in an annular groove 37 near the upper end of the member 34 and bears against the flange 28b. The spring washer 36 assures accurate positioning of the cylindrical member 34 in the guide member 28.

The adjusting knob 27 is fixed to the upper end of the member 34 by means of suitable screws 38 so that when the knob is rotated, the member 34 is also rotated. It will be understood that the knob 27 may be provided with a suitable scale indicating range or elevation and may also be provided with a slot or kerf 39 permitting adjustment of the knob by means of a small coin or the like.

The cylindrical member 34 is provided with an internally threaded bore 40 for receiving the threaded portion 41 of a plunger 42, the lower end of which bears against a flat 43 on the reticle holder 20. The plunger 42 is capable of axial movement but is retained against rotation by means of a cross pin 44, the opposite ends of which extend into the slots 32 and 33. With this adjusting mechanism, rotation of the knob 27 causes endwise or axial movement of the plunger 42 which in turn causes upward or downward movement of the reticle holder 20.

The springs 14 and 15 are relatively thin but have substantial width and are sufficiently strong in their spring action to retain the reticle holder 20 firmly against the lower end of the plunger 42 so that even if the telescopic sight is subjected to a sufficiently great shock to cause the reticle to move downwardly, the springs will return it firmly against the plunger 42 and thus into accurate adjustment. Due to the substantial width of the springs 14 and 15, they are very rigid transversely and thus the reticle cannot be displaced crosswise of the springs by any stress which would not seriously damage the sight.

Generally, the same principles may be utilized in a reticle mount which is adjusted both for windage and elevation. A typical reticle mount of this type is disclosed in Figs. 4 and 5. In this reticle mount, a reticle support 50 of the type described above is mounted in the lens barrel or tube 51 and is provided with springs 52 and 53 like those described above. The opposite ends of the springs 52 and 53 support a tubular member 54 which is provided with a rigid finger or arm 55 for engagement by the adjusting plunger 56 of the reticle adjustment 57. The reticle adjustment 57 is like that described above and disclosed in Figs. 1 and 3.

The member 54 carries a pair of spring members 58 and 59, the flat sides of which are disposed perpendicular to the flat sides of the springs 52 and 53. The inner ends of the springs 58 and 59 are connected to the reticle holder 60 which may be an annular or tubular member on which the reticle plate 61 is supported by screws or the like. The reticle support 60 is also provided with a rigid finger or arm 62 for engagement with the plunger 63 of the windage adjusting mechanism 64.

The springs 52 and 53 are inclined with respect to the support 50 so as to urge the arm 55 strongly against the plunger 56 and the windage adjustment springs 58 and 59 are also inclined with respect to the supporting member 54 to urge the arm 62 tightly against the plunger 63.

The arrangement of these springs is such that operation of the adjusting mechanism 57 will cause the supporting ring 54, the springs 58 and 59, the reticle holder 60 and the reticle 61 to move up and down bodily thereby making possible adjustment for range or elevation. Actuation of the adjusting mechanism 64 causes flexing of the springs 58 and 59 without in any way changing the adjustment of the springs 52 and 53 so that the reticle 61 is adjusted transversely of the tube in a horizontal plane to correct for windage. Thus, the range and windage adjustments are relatively independent. The above-described construction of course does away with the usual guide elements but at the same time assures a precise adjustment of the reticle.

Figure 7:
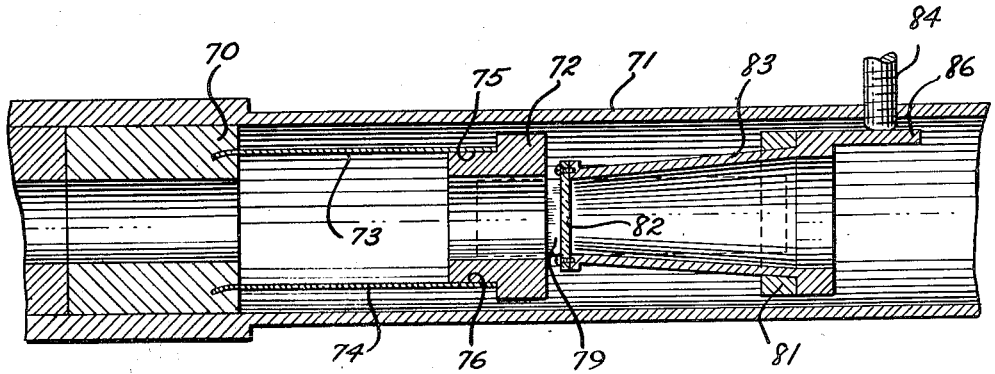
Fig. 7 is a view in longitudinal section of a portion of an optical instrument with the reticle mount of Fig. 6 installed therein and one of the adjusting screws illustrated diagrammatically.

The reticle mount is susceptible to further modification, and, if desired, the sets of springs may be disposed substantially end to end rather than one within the other. This form of reticle mount is shown in Figs. 6 and 7. In this modification, the support 70 is mounted in the lens barrel or tube 71 as described above and supports the tubular member 72 in the same way by means of the flat, substantially parallel springs 73 and 74. The member 72, as best shown in Fig. 6, is provided with parallel flats 75 and 76 to which the ends of the springs 73 and 74 are brazed or otherwise secured and with another set of flats 77 and 78 which are at right angles to the flats 75 and 76. Another pair of springs 79 and 80 are connected at one end to the flats 77 and 78 and supported at their outer ends in a ring-like member 81 which acts as the holder for the reticle. The reticle 82 may be mounted at the inner end of a conical sleeve or tube 83 which is carried by the ring 81 and extends close to the member 72. The elongated tube 83 brings the reticle near the zone of the optical system where the light rays converge so that the reticle can be sufficiently small to permit substantial adjustment in the lens barrel or tube 71 without reducing the field of the sight. Adjustment of the reticle 82 may be accomplished by means of plungers and adjusting knobs like those described above and herein illustrated as threaded members 84 and 85 which engage the ears 86 and 87 extending from the tube 83.

Upon downward movement of the member 84, the springs 73 and 74 are flexed downwardly, thereby moving downwardly the reticle 82 and all of the remaining supporting structure, except the member 70. Upon adjustment of the threaded member 85 to the left, as viewed in Fig. 6, only the springs 79 and 80 are flexed, thereby permitting transverse movement of the reticle 82 to adjust for windage. The stiffness of the springs 73 and 74 prevents sidewise shifting of the member 72 during adjustment for windage while the stiffness of the springs 79 and 80 transmits the movement of the threaded member 84 to the springs 73 and 74 in adjusting for elevation or range.

Many other variations may be made in the arrangement of the adjusting mechanisms without departing from the invention and, therefore, the forms of the invention described above should be considered as illustrative and not as limiting the scope of the following claims.

I claim:

1. A reticle mount for telescopic devices, comprising a tubular support adapted to be mounted in a telescope tube substantially coaxially thereof, a first pair of elongated, thin springs of greater width than thickness, the width of said springs rendering them substantially rigid in the direction of their width, said springs being fixed at one end to said support and adapted to extend substantially lengthwise of said tube, a tubular member fixed to the ends of said springs opposite to said support, said member being of smaller external dimensions than the internal dimensions of said tube, a second pair of elongated, thin springs of greater width than thickness, the width of said springs rendering them substantially rigid in the direction of their width, said springs being fixed at one end to said tubular member and adapted to extend lengthwise of said tube, said second springs being disposed with their wider faces substantially perpendicular to the wider faces of said first pair of springs, a reticle supported by the ends of said second pair of springs opposite to said member, and separate means to flex said first and second springs to move said reticle along right angularly related lines.

2. A reticle mount for telescopic devices, comprising a tubular support adapted to be mounted in a telescope tube, a first pair of flat, substantially straight and parallel springs fixed at one end to said support and adapted to extend substantially lengthwise of said tube, a tubular member fixed to the ends of said springs opposite to said support, said member being of smaller external dimensions than the internal dimensions of said tube, a second pair of flat, substantially straight and parallel springs fixed at one end to said tubular member and adapted to extend lengthwise of said tube toward said support, said second springs being disposed with their flat faces substantially perpendicular to the flat faces of said first pair of springs, a reticle supported by the ends of said second pair of springs opposite to said member, and separate means to flex said first and second springs to move said reticle along right angularly related lines.

3. A reticle mount for telescopic devices, comprising a tubular support adapted to be mounted in a telescope tube substantially coaxially thereof, a first pair of thin flat, substantially straight and parallel springs fixed at one end to said support and adapted to extend substantially lengthwise of said tube, a tubular member fixed to the ends of said springs opposite to said support, said member being of smaller external dimensions than the internal dimensions of said tube, a second pair of thin flat, substantially straight and parallel springs fixed at one end to said tubular member and adapted to extend lengthwise of said tube away from said support, said second springs being disposed with their flat faces substantially perpendicular to the flat faces of said first pair of springs, a reticle supported by the ends of said second pair of springs opposite to said member, and separate means to flex said first and second springs to move said reticle along right angularly related lines.

4. A reticle mount for telescopic devices, comprising a tubular support adapted to be mounted in a telescope tube substantially coaxially thereof, a first pair of thin flat, substantially straight and parallel springs fixed at one end to said support and adapted to extend substantially lengthwise of said tube, a tubular member fixed to the ends of said springs opposite to said support, said member being of smaller external dimensions than the internal dimensions of said tube, a second pair of thin flat, substantially straight and parallel springs fixed at one end to said tubular member and adapted to extend lengthwise of said tube, said second springs being disposed with their flat faces substantially perpendicular to the flat faces of said first pair of springs, a tubular reticle holder connected to the ends of said second pair of springs opposite to said support, said reticle holder having a portion extending toward said support between said second pair of springs and having an inner end adjacent to said support, a reticle mounted on said inner end, and separate means to flex said springs to move said reticle along right angularly related paths.

5. A reticle mount for optical instruments comprising a first tubular member adapted to be fixedly mounted in the lens tube of an optical instrument substantially coaxially thereof, a second tubular member, a pair of substantially straight ribbon-like spring strips having wide faces and narrow edges connected at opposite ends to said first and second members to extend lengthwise of said tube and maintain said members substantially parallel while permitting relative movement therebetween, said springs being inclined at an angle to the axes of said members to urge them out of axial alignment, a third tubular member, a second pair of substantially straight, ribbon-like spring strips to extend lengthwise of said tube, the second pair of strips having wider faces and narrow edges connecting said second and third members to maintain them substantially parallel, the wide faces of said second pair of strips being substantially perpendicular to the wide faces of said first pair of strips to permit movement of said third member relative to said second member at substantially a right angle to the movement of said second member relative to said first member, and a reticle supported by said third member.

6. A reticle mount for optical instruments comprising a first tubular member adapted to be fixedly mounted in the lens tube of an optical instrument substantially coaxially thereof, a second tubular member, a pair of substantially straight spring strips having substantially parallel wide opposite faces and narrow edges connected at opposite ends to said first and second members to extend lengthwise of said tube and maintain said members substantially parallel while permitting relative movement therebetween, said springs being inclined at an angle to the axes of said members to urge them out of axial alignment, a third tubular member, a second pair of substantially straight spring strips to extend lengthwise of said tube, the second pair of strips having substantially parallel wide opposite faces and narrow edges connecting said second and third members to maintain them substantially parallel, the wide faces of said second pair of strips being substantially perpendicular to the wide faces of said first pair of strips to permit movement of said third member relative to said second member at substantially a right angle to the movement of said second member relative to said first member, said second pair of spring strips being inclined at an angle to the axes of said second and third members to urge them out of axial alignment, and a reticle supported by said third member.

7. An optical instrument comprising a lens tube, a tubular supporting element fixedly mounted in said lens tube substantially coaxially thereof, a pair of substantially straight spring strips having opposite substantially parallel wide faces and narrow edges, each fixed at one end to said supporting element and extending lengthwise of said tube on opposite sides of its axis with their wide faces spaced apart and substantially parallel, a tubular member fixed to the opposite ends of said strips and movable in a path transverse to the axis of said tube by flexing of said strips, an adjusting knob rotatably mounted on said lens tube, means responsive to rotation of said knob for flexing said strips to move said member along said path, a second pair of substantially straight spring strips having opposite substantially parallel wide faces and narrow edges, each fixed at one end to said tubular member and extending lengthwise of said tube on opposite sides of its axis, said second pair of strips being flexible transversely at substantially a right angle to the first-mentioned pair of strips, another tubular member fixed to the ends of the second pair of strips, a reticle supported by said other tubular member, another knob rotatably mounted on said tube, and means responsive to rotation of said other knob for flexing said second pair of spring strips to move said other tubular member relative to the first-mentioned tubular member.

JOHN LIONEL RAWLINGS.

REFERENCES CITED

The following references are of record in the file of this patent:

UNITED STATES PATENTS

| Number | Name | Date |
|---|---|---|
| 1,950,790 | Fahrenwald | Mar. 13, 1934 |
| 2,025,748 | Howe | Dec. 31, 1935 |
| 2,045,670 | Noske | June 30, 1936 |
| 2,094,623 | Stokey | Oct. 5, 1937 |
| 2,177,605 | Whittemore | Oct. 24, 1939 |
| 2,240,536 | Woxen | May 6, 1941 |
| 2,344,877 | Liebl | Mar. 21, 1944 |
| 2,355,384 | Litschert | Aug. 8, 1944 |
| 2,372,879 | Bjorkland | Apr. 3, 1945 |
| 2,427,516 | Unertl et al. | Sept. 16, 1947 |
| 2,439,595 | Cooke | Apr. 13, 1948 |
| 2,496,045 | Ford | Jan. 31, 1950 |
| 2,537,917 | Simmons | Jan. 9, 1951 |